United States Patent [19]

Ashkin et al.

[11] 4,239,330
[45] Dec. 16, 1980

[54] MULTIPLE OPTICAL SWITCH

[75] Inventors: Arthur Ashkin, Rumson; Walter J. Tomlinson, III, Holmdel, both of N.J.

[73] Assignee: Bell Telephone Laboratories, Incorporated, Murray Hill, N.J.

[21] Appl. No.: 952,282

[22] Filed: Oct. 18, 1978

[51] Int. Cl.³ ............................................. G02B 5/14
[52] U.S. Cl. ................... 350/96.18; 350/96.16
[58] Field of Search ............. 350/96.15, 96.16, 96.18, 350/96.20, 96.21, 96.22, 175 GN

[56] References Cited

U.S. PATENT DOCUMENTS

| | | | |
|---|---|---|---|
| 3,829,195 | 8/1974 | Rawson | 350/96.18 |
| 3,937,557 | 2/1976 | Milton | 350/96.16 |
| 4,033,669 | 7/1977 | Hanson | 350/96.15 |
| 4,134,639 | 1/1979 | DiVita | 350/96.15 |

FOREIGN PATENT DOCUMENTS

| | | | |
|---|---|---|---|
| 1946693 | 8/1970 | Fed. Rep. of Germany | 350/96.18 |
| 2745940 | 4/1978 | Fed. Rep. of Germany | 350/96.18 |

OTHER PUBLICATIONS

Smith, "Acoustically Operated Fiber Optic Switch," IBM Tech. Discl. Bulletin, vol. 14, No. 2, Jul. 1971, p. 652.
Ishikawa et al, "Beam Splitting and Coupling Circuits Using a Selfoc Lens," 1977, Gen. Natl. Mtg. of IJECE, Mar. 1977, pp. 4-220(916).
Kobayashi et al, "Micro-Optics Devices for Branching, Coupling, . . .", Int'l Conf. on IOOFC, Tech. Digest, Jul. 1977, pp. 367-370.
Usui et al, "Three-Way Optical Directional Coupler", [Journal Unknown], Mar. 1978, p. 852.

*Primary Examiner*—John K. Corbin
*Assistant Examiner*—John D. Lee
*Attorney, Agent, or Firm*—Michael B. Einschlag

[57] ABSTRACT

A multiposition optical switch is disclosed in which two quarter-period graded refractive index (GRIN) lenses (1 and 2) having first (1.2 and 2.1) and second (1.1 and 2.2) end surfaces are supported in a structure (33 and 34) in an axially aligned fashion with their first surfaces abutting in a substantially parallel relation which permits rotating at least one lens about the common lens axis (3 and 3.1). An input fiber (10) is affixed to the second surface (1.1) of one GRIN lens at a predetermined radial offset to the common lens axis; and a multiplicity of output fibers (11–16) are affixed to the second surface (2.2) of the other lens at the same predetermined radial offset, but at a plurality of angular displacements about the common lens axis. By rotating one lens relative to the other, light from the input fiber is selectively coupled to the output fibers.

11 Claims, 6 Drawing Figures

MULTIPLE OPTICAL SWITCH

BACKGROUND OF THE INVENTION

The invention relates to optical switches and more particularly to multipole optical fiber switches.

The development of optical communications systems requires various devices for interconnecting, coupling and switching signals between optical sources and receptors such as optical fibers. Such switches could be used, for example, for switching different attenuators or delays into a communications line, for connecting sources with different wavelengths to a communications line to test a wavelength multiplexer and for many other applications.

Such optical fiber switches should provide for low loss in each position, high isolation between ports, a relatively fast switching time and a reasonably low cost. However, a problem with coupling light directly between optical fibers is that it must be done with great precision. As is indicated in U.S. Pat. No. 4,033,669, this requires the machining of parts to high tolerances.

SUMMARY OF THE INVENTION

A multipole optical switch constructed according to the present invention comprises two quarter-period graded refractive index (GRIN) lenses supported in an axially aligned fashion with their first surfaces butting in a substantially parallel relation so as to form a common lens axis, means for supporting the two lenses which permits rotating the second lens about the common lens axis while maintaining the two lenses in the substantially parallel relation, and a plurality of optical element sets each including an optical source and a plurality of optical receptors. The optical source of each optical element set is mounted at the second surface of the first lens in a radially offset relation to the common lens axis at a predetermined distance and the optical receptors of each optical element set are affixed to the second surface of the second lens in a radially offset relation to the common lens axis at the same predetermined distance from but at a plurality of angular displacements about the common lens axis. By rotating the second lens about the common lens axis light from the optical source is selectively coupled to one of the optical receptors.

BRIEF DESCRIPTION OF THE DRAWING

A complete understanding of the present invention and of the above and other objects thereof may be gained from a consideration of the following detailed description presented hereinbelow in connection with the accompanying drawings in which.

DETAILED DESCRIPTION

Figure 1:
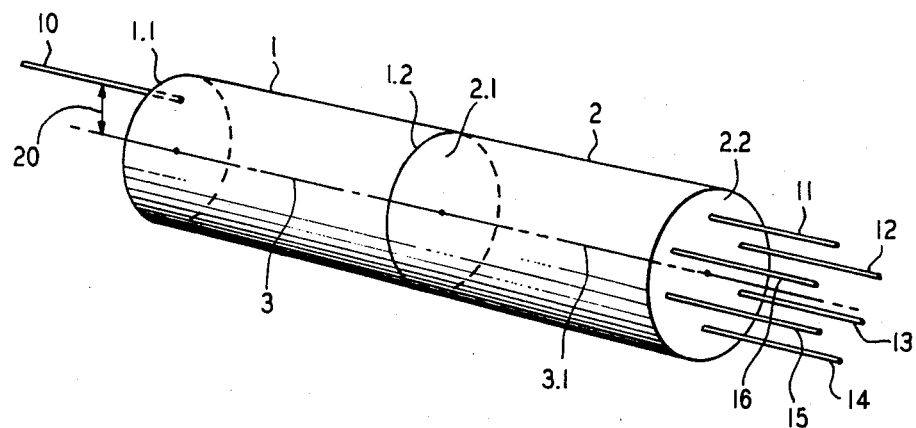
FIG. 1 shows in partially pictorial, partially schematic form an optical switch in the side view.

FIG. 1 shows an illustrative embodiment of the present invention. Optical source 10 is mounted at surface 1.1 of optical focusing element 1 at a radial displacement 20 from lens optic axis 3. Optical source 10 is shown illustratively to be a conventional optical fiber having a cylindrical core surrounded by a cladding. Radial distance 20 is chosen to be greater than the radius of the core of the optical fiber, and preferably greater than the radius of the cladding. The optical source may as well be chosen to be a laser, a light-emitting diode, or any other optical source known to those skilled in the art. Radiation from optical source 10 enters optical focusing element 1, illustratively taken to be a graded refractive index (GRIN) lens element. An optical beam longitudinally propagating through a GRIN-rod type lens follows substantially a sinusoidal path. As the rays representing the light beam advance through the lens, such rays alternatively converge and diverge at repetitive intervals related to the period of the sinusoidal path. The length of lens element 1 is made equal to one-quarter of the period of the sinusoidal path of the beam passing therethrough. As a result, radiation introduced at surface 1.1 of lens element 1 from a point, such as light from optical source 10, exits surface 1.2 of lens element 1 as collimated radiation. This collimated beam of radiation leaves lens element 1 through surface 1.2 and enters lens element 2, also a quarter-period GRIN lens, through surface 2.1 at a small angle. Lens element 2 is disposed at lens element 1 so that surface 1.2 and surface 2.1 are butted to each other. Lens element 1 and lens element 2 are aligned so that lens optic axis 3 of lens element 1 and lens optic axis 3.1 of lens element 2 are substantially in line with one another and form a common lens axis. Surface 1.2 of lens element 1 and surface 2.1 of lens element 2 are substantially flat and substantially parallel to one another.

The collimated beam of radiation which enters lens element 2 through surface 2.1 is focused to an image of the light from optical source 10. The image point lies in the plane formed by lens optic axis axes 3.1 and the point at which optical source 10 is mounted at surface 1.1 of lens element 1. The image point is displaced from lens optic axis 3.1 by the same radial distance as optic source 10 is displaced from lens optic axis 3, i.e., distance 20, but the displacement of the image point from lens axis 3.1 is on the opposite side from that of the displacement of optic source 10 from lens axis 3. The light emerging from surface 2.2 then couples into an optical receptor, shown illustratively as optical fiber 14.

Figure 2:
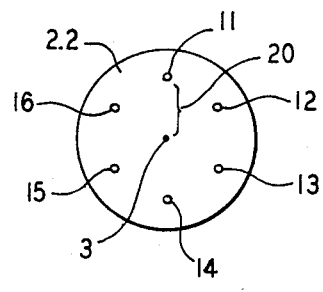
FIG. 2 shows in partially pictorial, partially schematic form the optical switch shown in FIG. 1 in an end view.

As lens element 2 is rotated relative to lens element 1 the image of optical source 10 is coupled successively to various optical receptors 11, 12, 13, 14, 15 and 16 which are mounted at surface 2.2, all at a radial distance equal to distance 20 from lens optic axis 3.1 but at a multiplicity of angles about lens optic axis 3.1, as shown in FIG. 2. Thus, by rotating lens element 2 with respect to lens element 1, light may be coupled selectively from optical source 10 to the desired one of optical receptors 11, 12, 13, 14 or 15. It is to be noted that the switch is reciprocal in that either end can serve as input or output.

The use of GRIN lens elements for lens element 1 and lens element 2 provides a high numerical aperture for efficient light transmission into and out of optical fibers while at the same time providing low distortion focusing.

The switch is insensitive to the mode configuration of the light energy passing therethrough and thereby provides substantially equal coupling for all optical modes; the switch is also relatively insensitive to different optical wavelengths of radiation and thereby provides substantially equal coupling for light of different wavelengths; and the switch is relatively insensitive to translational displacements of lens element 2 relative to lens element 1 along the common lens axis formed by lens optic axis 3 and lens optic axis 3.1.

For minimum losses in the switch it is important to eliminate reflections at the various interfaces. This could be accomplished by applying antireflection coatings to surfaces 1.1, 1.2, 2.1 and 2.2, and also to the various optical sources and receptors. However, between the optical source(s) and suface 1.1, and between surface 2.2 and the optical receptors, it will generally be most convenient to use a transparent index-matching cement which will not only eliminate reflections, but will also hold the source(s) and receptors in position. Between surfaces 1.2 and 2.1 it will generally be most convenient to use an index-matching fluid, which will also serve as a lubricant for the switch.

Figure 3:
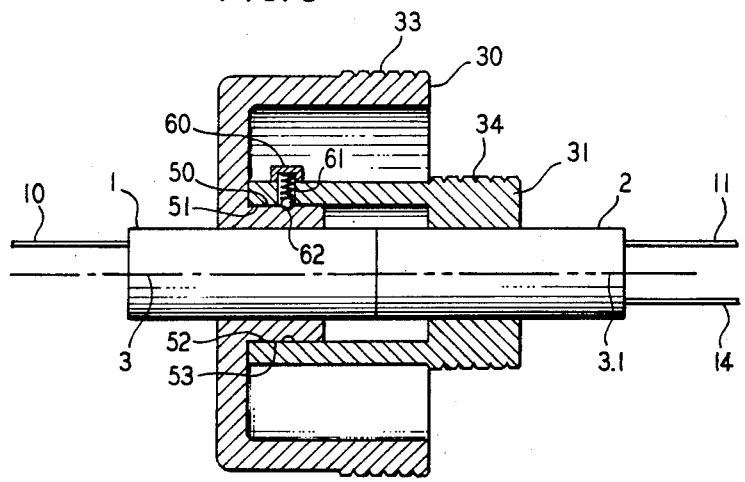
FIG. 3 shows in partially pictorial, partially schematic form an embodiment of the present invention using a support mechanism for rotating one lens element with respect to the second lens element.

FIG. 3 shows an embodiment of the present invention where lens element 1 is a GRIN rod, lens element 2 is a GRIN rod, optical source 10 is an optical fiber, and optical receptors 11, . . . , 16 are optical fibers. GRIN rod 1 is held in mechanical sleeve 30 and GRIN rod 2 is held in mechanical sleeve 31. Sleeve 30 and sleeve 31 are machined to rotate smoothly on precision bearing surfaces 50, 51, 52 and 53. Bearing surfaces 50, 51, 52 and 53 are concentric with lens optic axes 3 and 3.1. Spring 61 pushes ball 62 against a shallow groove with a depression at desired angular spacings to provide positive detents. Light is coupled from fiber 10 into the desired one of fibers 11, . . . , 16 by rotating lens element 2 relative to lens element 1 to the appropriate detent by using knurled grip 34 on sleeve 31 and knurled grip 33 on sleeve 30. A stop (not shown) can be provided to prevent excessive rotation of the switch and twisting of the fibers.

Figure 4:
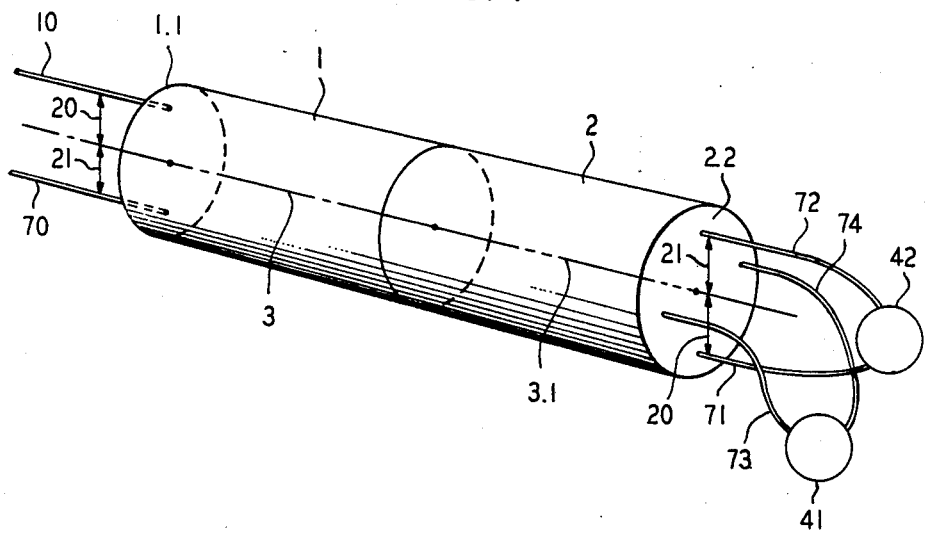
FIG. 4 shows in partially pictorial, partially schematic form an optical switch for inserting various attenuators into an optical communications line.

FIG. 4 illustrates the manner in which the present invention is used to fabricate a device for switching attenuators 41 and 42 into an optical communications line. Light radiation input to the optical switch from optical fiber 10 is coupled into optical fiber 71 in the same manner as has been previously discussed hereinabove. Fiber 71 is mounted at surface 2.2 of GRIN lens element 2 at the same radial distance 20 from lens optic axis 3.1 that fiber 10 is displaced from lens optic axis 3 of GRIN lens element 1. Fiber 72 is mounted at the same radial displacement 21 from lens optic axis 3.1 that fiber 70 is displaced from lens optic axis 3 by GRIN lens element 1. When fibers 10 and 71 are aligned so that they are on the opposite sides of a common lens axis of the switch so that light entering the switch from fiber 10 exits into fiber 71, fibers 72 and 70 have the same reciprocal relationship. When fabricating a device for use in switching various attenuators into an optical switch it may be convenient to have the radial displacements 20 and 21 equal. A rotation of GRIN lens element 2 relative to GRIN lens element 1 will selectively insert attenuator 41 or 42 into the path of radiation passing into the switch from optical fiber 10 and which finally leaves the device through optical fiber 70.

The device shown in FIG. 4 is merely illustrative of the many devices which may be made according to the present invention. For example, a multiplicity of attenuator devices may be mounted at lens surface 2.2 of GRIN lens element 2. A further example would be to mount some attenuators as in FIG. 4 and some receptors as shown in FIG. 1 at lens surface 2.2 of GRIN lens element 2.

Figure 5:
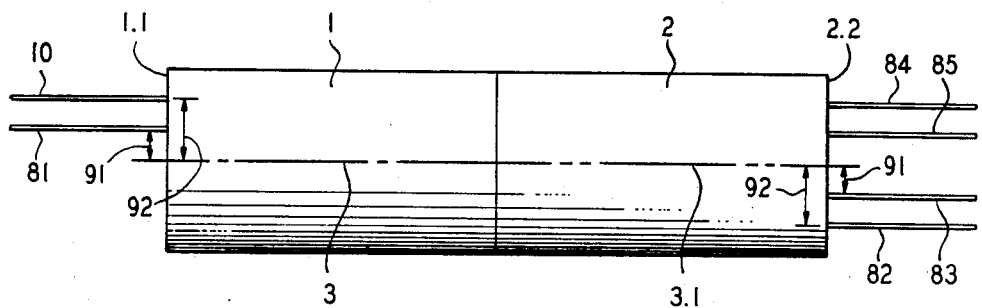
FIG. 5 shows in partially pictorial, partially schematic form a multipole optical switch.

As another example, the switch may serve as a multipole switch. This use is accomplished in one case shown in FIG. 5 by mounting fibers 10 and 81 at lens surface 1.1 of GRIN lens element 1 at different distances 92 and 91 from lens optical axis 3. Similarly fibers 82 and 84 are mounted at lens surface 2.2 of GRIN lens element 2 at the same displacement 92 from lens optic axis 3.1 as that of fiber 10 and fibers 83 and 85 are mounted at lens surface 2.2 of GRIN lens element 2 at the same displacement 91 from lens optic axis 3.1 as that of fiber 81. Fibers 81 and 10 are aligned on surface 1.1 of GRIN lens element 1 such that a straight line may be drawn to intersect lens axis 3 of lens element 1 and the intersection of both fibers 81 and 10 on surface 1.1. The alignment of the pair of fibers 82 and 84 and the pair 83 and 85 on lens surface 2.2 of GRIN lens element 2 is the same as that of 10 and 81 but, as in this case, with respect to lens optic axis 3.1. The alignment described with respect to a straight line is not essential, what is essential is that the pairs of fibers on surface 2.2 have the same relation both as to distance from the lens axis 3.1 and angular orientation about it as the pairs of fibers have with respect to lens axis 3 on surface 1.1.

Figure 6:
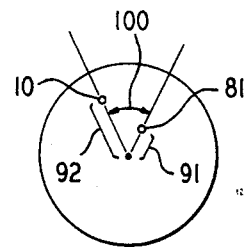
FIG. 6 shows in partially pictorial, partially schematic form an alternative end view for a multipole optical switch of the type shown in FIG. 5.

FIG. 6 shows that in general fibers 10 and 81 have radial displacements 91 and 92 and an angular displacement 100 with respect to each other. Pairwise fibers 82 and 84 and 83 and 85 must retain similar values.

Light entering the switch from fibers 10 and 81 will then couple into fibers 82 and 83, respectively. By rotating lens element 2 with respect to lens element 1, light will couple from fibers 10 and 81 to fibers 84 and 85, respectively.

The same principal described above is available for switching devices such as attenuators into optical lines as shown in FIG. 4 in order to switch devices into several optical lines.

We claim:

1. Apparatus for selectively coupling light which comprises:
   first (1) and second (2) graded refractive index rods, each of said first and said second rods propagating light therethrough in substantially a sinusoidal path and having a length approximately equal to one-quarter of the period of the sinusoidal path, each of said first and said second rods further having first (1.2 and 2.1) and second (1.1 and 2.2) end surfaces;
   an optical source (10) terminated at said second surface (1.1) of said first rod at a predetermined distance from the common lens axis (3 and 3.1); and
   a plurality of optical receptors (11–16) terminated at said second surface (2.2) of said second rod at said predetermined distance from said common lens axis at a plurality of angular displacements about said common lens axis;
   characterized in that said apparatus further comprises:
   means (30 and 31) for supporting said first and said second rods in axially aligned fashion with their first surfaces abutting in substantially parallel relation to define a common lens axis in such a manner that said second rod is rotatable about said common lens axis while maintaining said first surfaces in said substantially parallel relation.

2. Apparatus for selectively coupling light as defined in claim 1 in which said optical source is an optical fiber.

3. Apparatus for selectively coupling light as defined in claim 2 in which at least one of said optical receptors is an optical fiber.

4. Apparatus for selectively coupling light as defined in claim 1 in which at least one of said optical receptors is an optical fiber.

5. Apparatus for use with a plurality of optical element sets each including an optical source and a plurality of optical receptors to selectively couple light between said optical source of one optical element set and said optical receptors of said one optical element set while maintaining substantial optical isolation between said optical element sets which comprises:
  first (1) and second (2) graded refractive index rods, each of said first and said second rods propagating light therethrough in substantially a sinusoidal path and having a length approximately equal to one-quarter of the period of the sinusoidal path, each of said first and said second rods further having first (1.2 and 2.1) and second (1.1 and 2.2) end surfaces;
  said optical source (10) from each of said optical element sets terminated at said second surface (1.1) of said first rod at a separate predetermined distance from the common lens axis (3 and 3.1) for each of said optical element sets; and
  said plurality of optical receptors (11-16) from each of said optical element sets terminated at said second surface (2.2) of said second rod at said separate predetermined distance from the common lens axis at a plurality of anuglar displacements about said common lens axis;
  characterized in that said apparatus further comprises:
  means (30 and 31) for supporting said first and said second rods in axially aligned fashion with their first surfaces abutting in substantially parallel relation to define a common lens axis in such a manner that said second rod is rotatable about said common lens axis while maintaining said first surfaces in said substantially parallel relation.

6. Apparatus as defined in claim 5, in which at least two of said separate predetermined distances from the common lens axis for each of said optical element sets are equal.

7. Apparatus as defined in claim 5, in which at least one of said optical sources is an optical fiber.

8. Apparatus as defined in claim 7 in which at least one of said optical receptors is an optical fiber.

9. Apparatus as defined in claim 5, in which at least one of said optical receptors is an optical fiber.

10. Apparatus for selectively coupling one of a plurality of optical apparatus each having at least two ports into an optical transmission system which comprises:
  first (1) and second (2) graded refractive index rods, each of said first and second rods propagating light therethrough in substantially a sinusoidal path and having a length approximately equal to one-quarter of the period of the sinusoidal path, each of said first and said second rod further having first (1.2 and 2.1) and second (1.1 and 2.2) end surfaces;
  an optical source (10) of said transmission system terminated at said second surface (1.1) of said first rod at a first predetermined distance (20) from the common lens axis (3 and 3.1); and
  a plurality of optical fibers (71 and 73) having a first end terminated at said second surface (2.2) of said second rod at said first predetermined distance from said common lens axis at a plurality of angular displacements about said common lens axis and each having a second end terminated at one of said at least two ports of one of said plurality of optical apparatus;
  characterized in that said apparatus further comprises:
  an optical receptor (70) of said transmission system terminated at said second surface (1.1) of said first rod at a second predetermined distance (21) from said common lens axis;
  a plurality of optical fibers (72 and 74) having a first end terminated at said second surface (2.2) of said second rod at said second predetermined distance from the common lens axis at a plurality of angular displacements about said common lens axis and each having a second end terminated at another one of said at least two ports of one of said plurality of optical apparatus; and
  means (30 and 31) for supporting said first and said second rods in axially aligned fashion with their first surfaces abutting in substantially parallel relation to define a common lens axis in such a manner that said second rod is rotatable about said common lens axis while maintaining said first surfaces in said substantially parallel relation, whereby a selected one of said plurality of optical apparatus can be coupled into the transmission path between said optical source and said optical receptor of said transmission system.

11. Apparatus for selectively coupling a plurality of optical apparatus having at least two ports into an optical transmission system as defined in claim 10 in which said first predetermined distance is substantially the same as said second predetermined distance.

* * * * *